Figure 1:
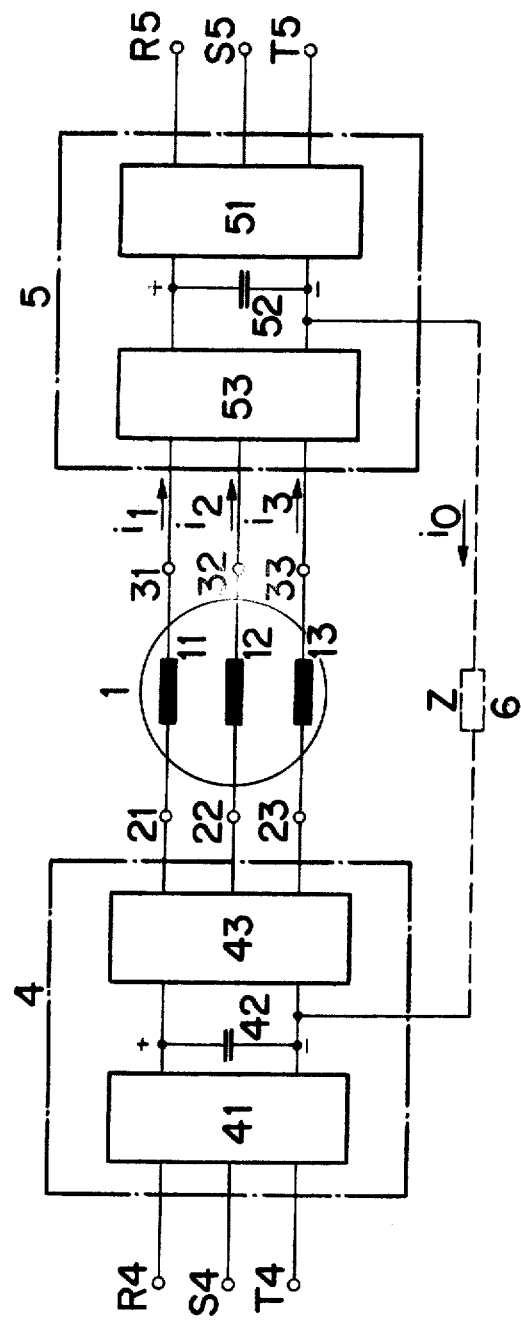

United States Patent [19]
Abraham

[11] 3,875,491

[45] Apr. 1, 1975

[54] ARRANGEMENT FOR SUPPLYING MULTI-PHASE ELECTRIC POWER CONSUMERS BY MEANS OF CONVERTERS

[75] Inventor: Ludwig Abraham, Mannheim, Germany

[73] Assignee: BBC Brown Boveri & Co., Baden, Switzerland

[22] Filed: July 24, 1973

[21] Appl. No.: 382,051

[30] Foreign Application Priority Data
July 26, 1972 Germany.......................... 2236554

[52] U.S. Cl.................... 321/5, 318/227, 321/27 R
[51] Int. Cl. ........................................... H02m 5/44
[58] Field of Search............... 318/227; 321/5, 27 R

[56] References Cited
UNITED STATES PATENTS

| | | | |
|---|---|---|---|
| 3,242,408 | 3/1966 | Hetzel............................ | 318/237 X |
| 3,343,063 | 9/1967 | Keeney, Jr. et al.................... | 321/5 |
| 3,345,549 | 10/1967 | Hauser et al....................... | 318/227 |
| 3,732,473 | 5/1973 | Johnston............................ | 321/5 X |
| 3,750,004 | 7/1973 | Walker ............................. | 321/5 X |
| 3,781,635 | 12/1973 | Sauer............................ | 321/27 R X |

Primary Examiner—R. N. Envall, Jr.
Attorney, Agent, or Firm—Pierce, Scheffler & Parker

[57] ABSTRACT

An arrangement for supplying a multi-phase electric power consumer such as for example an asynchronous or synchronous machine by means of a pair of independently operable and separately supplied converters and wherein the various phases of the power consumer have no direct connection with one another. One terminal of each phase of the power consumer is connected to a corresponding phase of a first converter and the other terminal of each phase of the power consumer is connected to a corresponding phase of a second converter. Each converter consists of a multi-phase rectifier connected to its own multi-phase alternating current power supply system, the output of the rectifier being connected via a direct current intermediate circuit to the input of a multi-phase inverter, and the output of the inverter being connected to the phase terminals of the power consumer. The potentials of the two independent multi-phase power supply systems are not fixed relative to each other by any external circuit arrangements but are allowed to develop in an unrestricted manner.

6 Claims, 2 Drawing Figures

ARRANGEMENT FOR SUPPLYING MULTI-PHASE ELECTRIC POWER CONSUMERS BY MEANS OF CONVERTERS

The present invention relates to an improved arrangement for supplying multi-phase electric power consumers by means of converters which are typically thyristor powered.

Systems of this type have been in use for several years in order to supply three-phase electrical machinery, with a variety of operating techniques being employed. Converters with intermediate d.c. voltage circuits are utilized, for example, to supply asynchronous machines, where a change in machine voltage is attained by varying the intermedite circuit voltage, or by a pulsation within the converter, for example by the "under-oscillation" technique. However, the use of such known converter equipment with intermediate d.c. voltage circuits leads to difficulties and problems because the output voltage contains relatively large amplitudes of harmonics which will load the power consumer in an undesirable manner, and which will, under certain conditions, adversely influence commutation by the converter.

Several measures are known which are designed to reduce the harmonic voltages, or currents respectively, at the a.c. output of the converter. For example, in the case of the under-oscillation technique, pulse systems have been designed in such manner that the harmonic amplitudes are kept to a minimum. It has also been appreciated that it will be advantageous, in the case of three-phase converters if the star-point of the load is not connected because then no harmonics of the current can be generated possessing an ordinal number that can be divided by three: this will render ineffective the third harmonic amplitude of the voltage which is rather large in the case where many converters are utilized.

In order to effect a further reduction in current harmonics, it is known to connect two or more converters in parallel with each other with their output voltages offset in phase. However, such parallel connection requires the use of compensating choke coils which not only lead to additional weight and costs but also to technical difficulties because components of direct current or direct voltage, generated in alternating current systems or voltages of lower frequency can arise across the output voltages of the two converters, causing a saturation of the iron core of the choke coil, rendering the coil ineffective and thus interfering with the functioning of the converter.

It is also known, in the case of three-phase power consumers, not to connect the windings of the individual phases with each other, i.e., by not using a star or delta connection, but rather to supply the power to each phase separately through converters by use of single-phase bridge circuits, whereby the single-phase converters usually have one common intermediate circuit. This system of using separate phase windings for the power feed is characterized by the fact that it makes feasible a reduction of the harmonics by shifting the phase of the output voltage of the two bridge halves relative to each other. However, the harmonics with an ordinal number divisible by three will be present in the phase voltage, with the result that this method remains limited to a small range of modulation.

It is also known to limit the formation of harmonic currents with an ordinal number divisible by three, in the case of a three-phase system, by conducting each of the phases in the load circuit through a separate winding of a choke, the windings being arranged on a single iron core. However, the use of such a choke will lead to the same problems as discussed above in connection with the use of a compensating choke.

The above-discussed problems apply also to multiphase systems with any number of phases $m$. It is possible to suppress current harmonics with ordinal numbers divisible by $m$ by use of single-phase supply and open star point. By the separate supply of the individual phases and use of single-phase bridges (which can be connected galvanically or can be kept separately) it is possible to reduce the harmonics in general but the current harmonics with an ordinal number divisible by $m$ will appear again and can be suppressed only by the addition of a choke.

The principal object of the present invention is to provide an improved form of power supply which overcomes the disadvantages of the known systems, as discussed above, and to establish an improved system where the harmonics are greatly reduced without the use of compensating chokes.

The invention solves the problem in that the phase terminals of various phases of the power consumer are not connected directly among each other, that there is associated, in each case, a first phase terminal of each phase of the power consumer with one phase of a multiphase converter, and that there is associated, in each case, a second phase terminal of each phase of the power consumer with one phase of a second multiphase converter, the two converters being independently operable and supplied, respectively from independent polyphase power supply sources, whereby the electrical potential difference between the two multiphase converters is not fixed by external circuit arrangements and is allowed to develop in an unrestricted manner.

In a further development of the invention, the power consumer can be designed in the form of a polyphase asynchronous or synchronous machine. The converters are provided in the form of self-controlled converter units.

Figure 2:
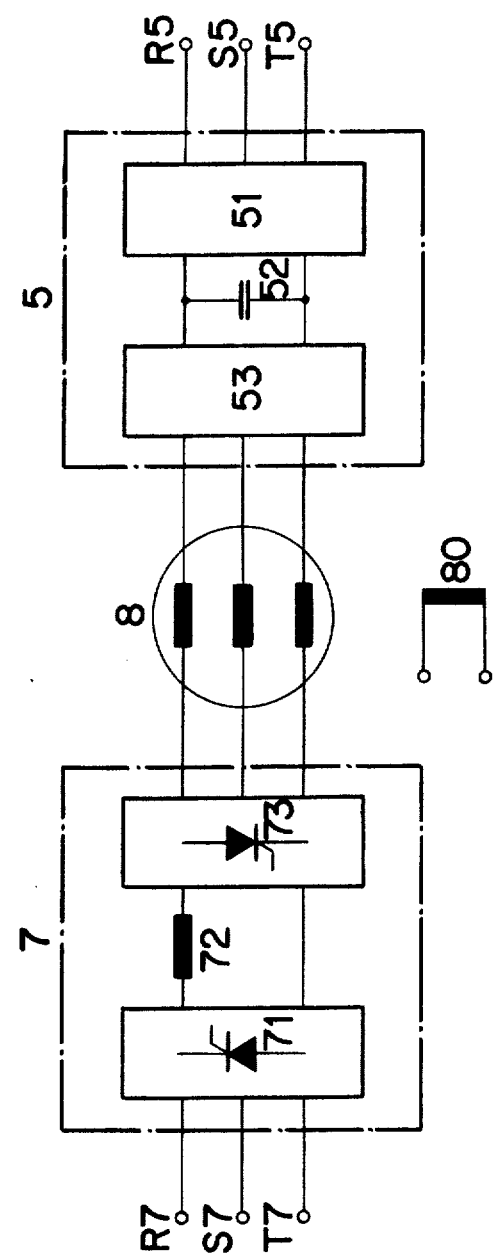

The foregoing as well as other features of the invention will become more apparent from the following detailed description of two applications thereof wherein:

FIG. 1 is a schematic diagram of one application of an embodiment of the invention to supply power to an asynchronous machine; and FIG. 2 is a view similar to FIG. 1 illustrating application of another embodiment of the invention to a synchronous machine.

With reference now to FIG. 1, an asynchronous machine 1 with three phases 11, 12 and 13 is seen to be supplied with power from two converters 4 and 5. The converter 4 is connected to the phase terminals 21, 22 and 23 of the machine 1 and converter 5 is connected to the phase terminals 31, 32 and 33. Converter 4 is seen to be comprised of a three-phase rectifier 41 supplied by a three-phase alternating current system R4, S4 and T4. The output of rectifier 41 is connected via an intermediate direct current circuit 42 having a support condenser connected across it with the input side of an inverter 43. Variable frequency three-phase a.c. output of the inverter 43, made possible by interposing the intermediate direct current circuit 42, is connected to the previously mentioned phase terminals 21, 22 and 23 of the three phases 11, 12 and 13 of the asynchronous machine 1.

In a similar manner, converter 5 is comprised of a three-phase rectifier 51 supplied by a separate three-phase alternating current system R5, S5 and T5, independent of the three phase power supply system R4, S4 and T4 the output of rectifier 51 being connected via an intermediate direct current circuit 52 having a support condenser with the input side of inverter 53. The three-phase a.c. output of inverter 53 is connected to the previously mentioned phase terminals 31, 32 and 33 of the phases 11, 12 and 13 of the machine 1.

Being independent, the potentials of the two three-phase supply systems R4, S4, T4 and R5, S5, T5 are not fixed relative to each other. In order to explain this arrangement, it will be assumed first that the two d.c. intermediate circuits 42, 52 are connected with each other by means of an impedance 6. In this case, according to Kirchoff's law, $$i_1 + i_2 + i_3 = i_0$$

because the sum of the currents flowing through lead-ins R4, S4, T4 as well as R5, S5, T5 must equal zero since there are no other connections through which compensating currents can flow. The current $i_0$ includes all in-phase components of currents $i_1$, $i_2$ and $i_3$, i.e., those harmonics the ordinal numbers of which are divisible by three, and possibly a d.c. component. If impedance 6 is made very high, these components of the phase currents, and particularly the fundamental oscillation, will flow unimpeded.

The improved arrangement proposed by the invention permits the use of all known methods for the voltage control, and for the reduction of the harmonic amplitudes, for example, the phase variation of the output voltage of the two converters relative to each other, pulse systems with offset phases in the two converters and similar systems.

The invention has the particular advantage that neither d.c. components of like direction nor in-phase under-oscillations(for example in the case of rapid changes in modulation) can be generated. It therefore becomes feasible in a further development of the invention to operate the two converters by means of completely dissimilar control systems, and where the control systems are tuned to each other in such manner that in the resulting voltage, the harmonics of higher ordinal number (greater than three) are kept very small, while the third harmonic can be allowed to become arbitrarily large.

The inventive concept of the invention can also be utilized to operate the two power supplying converters at different intermediate d.c. circuit voltages, or even to combine two converters operated by dissimilar control systems, known per se. FIG. 2 illustrates an important example, employing this principle. There it will be seen that a synchronous motor 8 provided with an excitation winding 80 is powered by way of a converter 7 which comprises a controlled rectifier 71 operating with thyristors, an intermediate d.c. circuit with a smoothing choke 72 connected in series, and an inverter 73 with load-controlled commutation operating with thyristors. This converter system is known under the German name "Stromrichtermotor." The commutation of inverter 73 by the voltage of the synchronous motor 8 is not possible at standstill, or at low speeds. The auxiliary measures for starting up of the motor, known and used heretofore, will cause jerky acceleration or are very expensive. It now becomes possible to combine the advantages of the Stromrichtermotor, i.e., low expenditures, with the advantages of the self-controlled converters (almost sinusoidal current characteristic at low frequencies) by including a second self-controlled converter 5, of the type provided in the FIG. 1 arrangement, in the arrangement of FIG. 2. The voltage of the converter 5 can be kept substantially lower, for example 10% lower, than the voltage of converter 7 with the result that the Stromrichtermotor 8 can be started smoothly at very minor additional expenditure.

In conclusion it is desired to point out that the inventive concept is not limited to three-phase power consumers, or electric machines but can be used for all multi-phase power consumers. The advantages become especially apparent at greater power outputs because it is then usually necessary to split the total power into two or more sectional converters so that the system proposed by the invention can be designed and built without additional costs.

I claim:

1. Arrangement for supplying multi-phase power consumers by means of converters wherein the terminals of the various phases of the power consumer have no direct connection with each other, comprising a first multi-phase converter including rectifier and inverter units interconnected by an intermediate direct current circuit, a first multi-phase alternating current supply system feeding the input side of the rectifier unit of said first converter, connections extending between the output terminals of the various phases of the inverter unit of said first converter and corresponding first terminals of the various phases of the power consumer, a second multi-phase converter including rectifier and inverter units interconnected by an intermediate direct current circuit, a second multi-phase alternating current supply system independent of said first multi-phase alternating current supply system feeding the input side of the rectifier unit of said second converter, and connections extending between the output terminals of the various phases of the inverter unit of said second converter and corresponding second terminals of the various phases of the power consumer, said first and second converters being operable independently of one another whereby the output potentials of the inverter units of said converters are not fixed relative to each other by external circuit arrangements and can be allowed to develop unrestrictedly and whereby harmonic currents with an ordinal number divisible by three are suppressed.

2. Arrangement as defined in claim 1 for supplying multi-phase power consumers by means of converters wherein the power consumer is constituted by a multi-phase asynchronous machine and wherein said first and second converters are of the self-controlled type.

3. Arrangement as defined in claim 2 for supplying multi-phase power consumers by means of converters wherein said first and second converters are operated by means of dissimilar control systems tuned to one another such that the magnitudes of harmonics in the resulting voltage of an ordinal number greater than three are minimized while the third harmonic is permitted to assume any arbitrary magnitude.

4. Arrangement as defined in claim 1 for supplying multi-phase power consumers by means of converters wherein the intermediate direct current circuit voltages of said converters differ from each other.

5. Arrangement as defined in claim 1 for supplying multi-phase power consumers by means of converters wherein said power consumer is constituted by a multi-phase synchronous machine, wherein one of said direct current intermediate circuits is current controlled and wherein the other direct current intermediate circuit is voltage controlled.

6. Arrangement as defined in claim 5 for supplying multi-phase power consumers by means of converters wherein the voltage of the direct current intermediate circuit which is voltage controlled is less than that of the direct current intermediate circuit which is current controlled.

* * * * *